United States Patent [19]

Bones et al.

[11] Patent Number: 4,895,773

[45] Date of Patent: Jan. 23, 1990

[54] ELECTROCHEMICAL CELL

[75] Inventors: Roger J. Bones, Abingdon; James L. Sudworth, Burton-on-Trent, both of England

[73] Assignee: Lilliwyte Societe Anonyme, Luxembourg

[21] Appl. No.: 253,267

[22] Filed: Oct. 4, 1988

[30] Foreign Application Priority Data

Oct. 6, 1987 [GB] United Kingdom ............... 8723407

[51] Int. Cl.[4] .............................................. H07M 2/00
[52] U.S. Cl. ........................................ 429/7; 429/61; 429/103
[58] Field of Search ................... 429/7, 59, 61, 65, 103

[56] References Cited

U.S. PATENT DOCUMENTS

| | | | |
|---|---|---|---|
| 1,733,334 | 10/1929 | Davis | 429/59 |
| 3,775,661 | 11/1973 | Frezzolini et al. | 429/58 X |
| 4,011,366 | 3/1977 | Bones et al. | 429/61 |
| 4,206,272 | 6/1980 | Fischer et al. | 429/62 |
| 4,327,157 | 4/1982 | Himy et al. | 429/61 |
| 4,774,156 | 9/1988 | Bones et al. | 429/103 |

FOREIGN PATENT DOCUMENTS

| | | |
|---|---|---|
| 1350354 | 4/1974 | United Kingdom . |
| 1536143 | 12/1978 | United Kingdom . |
| 2186420 | 8/1987 | United Kingdom . |

Primary Examiner—Stephen J. Kalafut
Attorney, Agent, or Firm—Arnold, White & Durkee

[57] ABSTRACT

The invention provides a rechargeable electrochemical power storage cell. The cell has an anode compartment defined between a cell casing and a separator, the anode compartment containing active anode material which is liquid at the operating temperature of the cell. The separator defines a cathode compartment containing an electrolyte which is liquid at the operating temperature of the cell, and an active cathode material. The separator separates said compartments from each other and during discharge of the cell the active anode material passes from the anode compartment to the cathode compartment through the separator, to enter the cathode compartment in ionic form. The active anode material passes through the separator from the cathode compartment to the anode compartment during charging of the cell. At least one of said compartments is sealed and is provided with switch means, which switch means is operative in response to an excursion, past a threshold value, of pressure in the sealed compartment arising from passage of active anode material through the separator during operation of the cell while it is connected to an external circuit, to prevent further operation of the cell while said pressure remains past said threshold value.

10 Claims, 2 Drawing Sheets

ELECTROCHEMICAL CELL

THIS INVENTION relates to an electrochemical cell. More particularly it relates to an electrochemical cell of the type comprising an anode compartment containing anode material, and a cathode compartment containing cathode material, the cell being rechargeable and said compartments being separated by a separator through which material passes from one compartment to the other during operation of the cell.

A rechargeable electrochemical power storage cell which comprises an anode compartment containing active anode material which is liquid at the operating temperature of the cell;

a cathode compartment containing an electrolyte which is liquid at the operating temperature of the cell and an active cathode material; and a separator which separates said compartments from each other and through which separator active anode material passes from the anode compartment to the cathode compartment during discharging of the cell, to enter the cathode compartment in ionic form, and through which separator the active anode material passes from the cathode compartment to the anode compartment during charging of the cell, at least one of said compartments being sealed and being provided with switch means, the switch means being operative in response to an excursion, past a threshold value, of pressure in the sealed compartment arising from movement of active anode material through the separator during operation of the cell while it is connected to an external circuit, thereby to prevent further operation of the cell while said pressure remains past said threshold value.

In said sealed compartment, there is typically a gas space above the liquid in the compartment which may be above or below atmospheric pressure. If the mode of operation (charge/discharge) of the cell is such as to transport material out of said compartment and through the separator into the other compartment, to reduce said gas pressure, there are typically no problems. However, if the mode is such as to transport material into said compartment, a pressure increase will occur, which, if the cell is overcharged or overdischarged beyond its design limits, can damage the cell. The switch means of the present invention accordingly preferably acts to combat such damage by preventing further operation of the cell, to prevent any further pressure increase in said compartment, if the pressure in said compartment exceeds the threshold value, which is predetermined and selected to provide a safe upper limit for pressure in said compartment. The switch means may thus be operative in response to an increase, past said threshold value, of pressure in the sealed compartment, to prevent further operation of the cell while said pressure exceeds the threshold value.

Each of said cell compartments may be sealed, each being provided with said switch means.

When the pressure increase occurs as the result of overcharging of the cell, this will involve an increase in pressure in the anode compartment, and the switch means may accordingly be operative to break the external circuit of the cell, thereby to prevent further overcharging. In this case, further charging will automatically be prevented and the external circuit will remain broken until pressure in the anode compartment is reduced, eg by short-circuiting the cell. If desired, each switch means may thus be arranged to prevent further operation of the cell by breaking the external circuit of the cell, in this fashion.

When the pressure increase occurs as the result of overcharging of the cell involving an increase in pressure in the anode compartment, the switch means may instead be operative to short-circuit the cell to prevent further overcharging. In this case, when the cell is short-circuited, this will lead to automatic discharge of the cell which relieves the pressure in the anode compartment, and in this case the switch means, as indicated hereunder, may be arranged automatically to break the short-circuit when the anode compartment pressure falls below said threshold value. If the charging potential is maintained across the cell, the short-circuit will be cylically made and broken, so that the pressure of the cell will continually cycle above and below the threshold value, at a safe level, until the charging potential is removed, eg when the cell is subsequently discharged. Thus, in a particular embodiment of the cell, the anode compartment may be sealed, being provided with said switch means, the switch means being arranged to prevent further operation of the cell in response to an increase, past said threshold value, of pressure in the anode compartment, by short-circuiting the cell while leaving the external circuit intact.

Typically, when the pressure increase occurs as a result of overdischarging, the switch means may be arranged to break the external circuit of the cell whereby it is discharged, until pressure is reduced in the compartment, eg by applying a charging potential to the cell via the external circuit, while short-circuiting the switch means.

As indicated above, each switch means may be automatically reversible, after operation thereof in response to a pressure excursion past the threshold value, in response to a retreat of the pressure past the threshold value in the opposite direction to the excursion, to permit further operation of the cell via the external circuit.

While a variety of switch means can be employed for the present invention, it is preferable to employ switch means of the type mentioned above which is automatically reversible in the sense that, when the pressure in the compartment in question drops below the threshold value, the switch means automatically breaks the short circuit or re-establishes the external circuit, as the case may be. A simple mechanical type of switch may be one such as a bellows-type switch which is resiliently flexible and which flexes in response to pressure changes, between positions in which it respectively prevents and permits operation of the cell. Thus a bellows can be provided for this purpose, which forms part of the wall of the compartment in question, and which conveniently communicates with the gas space above the liquid in said compartment.

Accordingly, each sealed compartment having said switch means may have a wall at least part of which is resiliently deformable to pressure changes in said compartment, said wall being provided with an electrical contact which forms part of the switch means and which is movable in response to pressure changes in said compartment to operate the switch means. Part of the wall of the compartment may thus be resiliently deformable, being provided by a resilient bellows which is provided with said contact.

When, as indicated above, each sealed compartment has switch means, this can be used to protect the cell against both overcharging and overdischarging.

It will also be appreciated that the present invention can be employed to limit the degree of charging and/or discharging which a cell can undergo during normal use, so that only a proportion of its capacity is employed. This can be useful in situations where long, reliable cell and battery life outweigh the loss of capacity involved.

While the invention can apply to eg sodium/sulphur cells in which the anode is molten sodium and the cathode compartment contains sulphur, sodium sulphide and/or sodium polysulphides in molten form, to regulate the level of charge or discharge respectively to a safe value below the fully charged state or to a safe value above the fully discharged state, a particular embodiment of the cel contemplates an anode which is molten sodium and the cathode is in the form of an electronically conductive electrolyte-permeable matrix impregnated with liquid electrolyte, the liquid electrolyte being sodium aluminium halide (eg chloride) molten salt electrolyte and the separator being a solid conductor of sodium ions such as beta alumina or nasicon, or a micromolecular sieve which contains sodium sorbed therein. In this embodiment the matrix may be formed from at least one member of the group comprising Fe, Ni, Co, Cr and Mn and compounds of said transition metals with at least one non-metal of the group comprising carbon, silicon, boron, nitrogen and phosphorous.

With regard to the solid conductor of sodium ions or micromolecular sieve, this separates the anode compartment from the cathode compartment so that any active anode substance such as sodium moving from the anode to the electrolyte, or vice versa, has to pass through the internal crystal structure of the solid conductor or through the microporous interior of the micromolecular sieve, as the case may be, passing in atomic form through the interface between the anode and separator and passing in ionic form through the interface between the electrolyte and separator.

By 'micromolecular sieve' is meant a molecular sieve having interconnected cavities and/or channels in its interior and windows and/or pores in its surface leading to said cavities and channels, the windows, pores, cavities and/or channels having a size of not more than 50 Angstrom units and preferably less than 20 Angstrom units. Such sieves include mineral micromolecular sieves such as the tectosilicates, examples of which are zeolites 13X, 3A and 4A.

For this type of cell the separator is typically tubular in shape and closed at one end, the cell having its outer housing or casing arranged concentrically around the tube, one electrode compartment being provided in the interior of the tube and the other being provided between the tube and the casing.

In the type of cell in question having a molten sodium anode, the volume of the molten sodium anode will decrease during discharging, while the volume of the contents of the cathode compartment and level liquid electrolyte increase correspondingly, and, during charging, the volume of the anode increases while the level of the electrolyte drops.

These changes in volume lead to the changes in pressure described above, and for this type of cell it is convenient, as indicated above, to have the bellows form part of the wall of the casing of the cell and/or of the sealed closure for the tube. A bellows will be provided typically for the anode compartment, and optionally for the cathode compartment as well. Whether the anode compartment bellows is on the cell casing or on the sealed tube closure depends on whether the cell is a so-called inside-anode cell (with the anode in the tube and the anode bellows on the sealed tube closure) or an outside-anode cell (with the anode in the space between the tube and casing and the anode bellows on the casing). The anode bellows can act to prevent overcharging by short-circuiting the cell or breaking the external circuit; and if there is a cathode bellows to prevent overdischarging, this will be on the other cell compartment which contains the cathode and can act to break the external circuit.

Accordingly, in particular embodiments of the cell, the active anode material may be sodium, the separator being a solid electrolyte which is a conductor of sodium ions. More particularly, the cathode may be in the form of an electrolyte-permeable electronically conductive porous matrix which is impregnated with the liquid electrolyte, the liquid electrolyte being sodium aluminium halide.

The invention will now be described, by way of example, with reference to the accompanying diagrammatic drawings in which.

Figure 1:
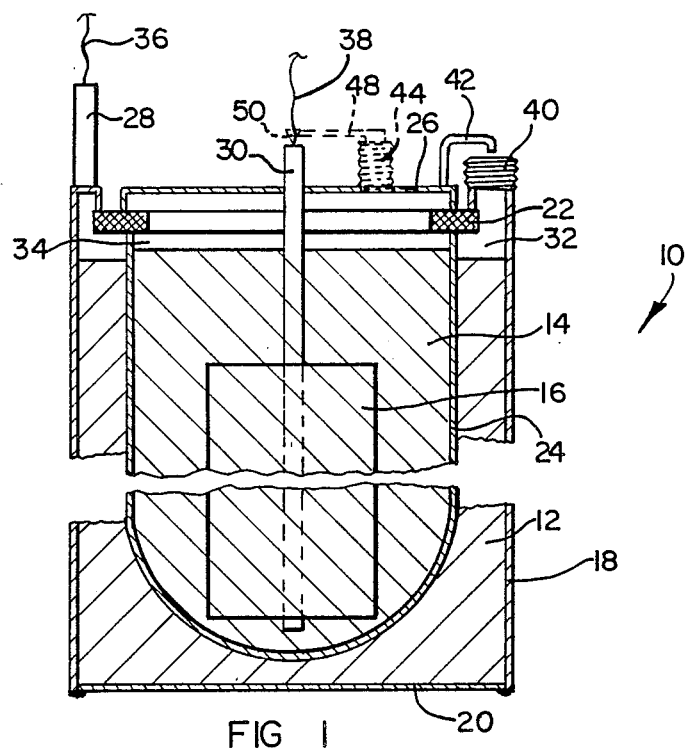
FIG. 1 shows a cell according to the invention in schematic sectional side elevation.

In FIG. 1 of the drawings, reference numeral 10 generally designates an electrochemical cell in accordance with the invention. The cells is shown broken midway along its length, typically having an outside diameter of about 50–60 mm and a length of about 300–600 mm. The cell shown has a molten sodium active anode material 12, a sodium aluminium halide molten salt electrolyte 14 and a cathode 16 which is immersed in the electrolyte 14 and in its discharged state comprises an electrolyte-permeable porous iron matrix which is electronically conductive and contains $FeCl_2$ in dispersed form therein as its charged active cathode substance. The matrix of the cathode 16 is saturated with the electrolyte 14 and has sufficient finely divided NaCl dispersed therein to ensure that, in all states of charge of the active cathode substance, the electrolyte 14 is an equimolar mix of NaCl and $AlCl_3$, is stoichiometrically exact $NaAlCl_4$.

The cell 10 has a mild steel outer casing 18 having a base 20 for supporting it in an upright attitude as shown. The casing 18 is sealed to an annular alpha-alumina insulating ring 22. An open ended beta-alumina separator tube 24 is located concentrically within the casing 18, the lower end of the tube 24 being closed and the upper or open end of the tube 24 being glass-welded to the alpha-alumina ring 22 in sealing fashion. The open end of the tube 24 is closed by a closure disc 26 of mild steel, sealed to the alpha-alumina ring 22. An anode terminal post 28 is welded to the casing 18, and a cathode terminal post 30 passes through a sealed central opening in the disc 26, downwardly into the electrolyte 14. The lower portion of the post 30 is embedded in and in electronic contact with the matrix of the cathode 16. The matrix acts as a cathode current collector, while the housing 18 acts as the anode current collector. There is a gas space 32 above the anode material 12, and a gas space 34 above the electrolyte 14. The cell is shown connected to an external circuit by electrical leads 36, 38 connected respectively to posts 28, 30.

The space between the casing 18 and tube 24, occupied by the anode sodium 12, forms an anode compartment, and the interior of the tube 24 forms a cathode compartment. These compartments are separated from each other by the separator tube 24, and by sealing of the tube 24, casing 18 and disc 26 to the alpha-alumina ring 22.

The overall charge/discharge reaction of the cell can be represented by the reaction:

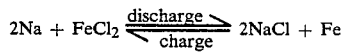

$$2Na + FeCl_2 \underset{charge}{\overset{discharge}{\rightleftharpoons}} 2NaCl + Fe$$

Accordingly, sodium passes from the anode compartment to the cathode compartment during discharging, through the separator 24; and it passes in the opposite direction during charging. During discharging the volume of the Fe/FeCl$_2$ active cathode substance increases, with a rise in the level of electrolyte, with a corresponding drop in the volume of molten sodium active anode substance; and, upon charging there is an increase in the volume of active molten sodium anode substance, with a corresponding drop in the level of molten electrolyte, arising from a decrease in volume of the Fe/FeCl$_2$ active cathode substance.

In accordance with the invention the anode compartment of the cell of FIG. 1 has switch means in the form of a bellows-type switch indicated at 40 in FIG. 1. This bellows 40 is of a suitable conducting material and is aligned with an electrical contact 42 electrically connected to the disc 26 which in turn is electrically connected to the cathode 16 via the post 30.

In use, as the volume of sodium of the anode 12 increases upon charging, gas pressure in the gas space 32 will increase. The bellows 40 is arranged so that the bellows 40 will move into engagement with the contact 42 when pressure in the anode compartment and hence in the gas space 32 exceeds a safe predetermined threshold value, corresponding, at least approximately, to the fully charged state of the cell 10, possibly with a slight safe degree of overcharge. As soon as this engagement is made, further overcharge is prevented by short-circuiting of the cell. This short-circuiting automatically leads to discharge of the cell and a reduction in volume of the anode material 12, so that the bellows 40 contracts out of engagement with the contact 42. Charging will then again automatically take place until contact is again made. This cycle of events is thus automatically repeated indefinitely, until the charging potential is removed, eg when the cell is subsequently discharged, whereupon said engagement is broken, and remains broken until the cell is again charged up to a state where the threshold pressure is exceeded.

Figure 2:
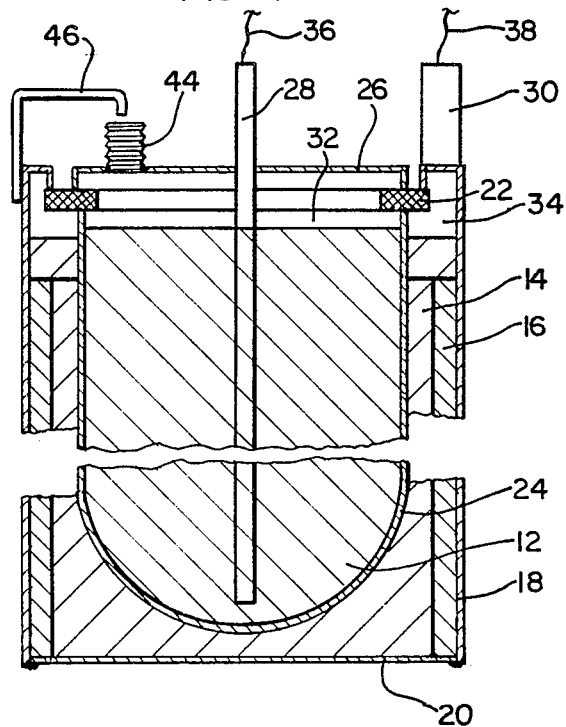
FIG. 2 shows a view similar to FIG. 1 of another cell according to the invention.

Turning to FIG. 2, in which, unless otherwise specified, the same reference numerals are shown for the same parts as in FIG. 1, the situation is shown where the anode 12 is in the compartment which is in the interior of the tube 24 and the cathode 16 is in the compartment which is in the space between the tube 24 and casing 18. The cathode 16 is tubular and is in electrical contact with the casing 18 and its matrix acts as the cathode current collector, the post 28 acting as the anode current collector.

The bellows switch of the cell 10 of FIG. 2 is shown at 44 in the disc 26, and the electrical contact is shown at 46, in contact with the casing 18.

Operating of the cell 10 of FIG. 2 is substantially the same as that of the cell 10 of FIG. 1, with the switch 44 engaging with the contact 46 when the cell 10 is overcharged, to short-circuit the cell, and said short-circuiting leading to breaking of said engagement, with cycling in this regard until the charging potential is removed.

Figure 3:
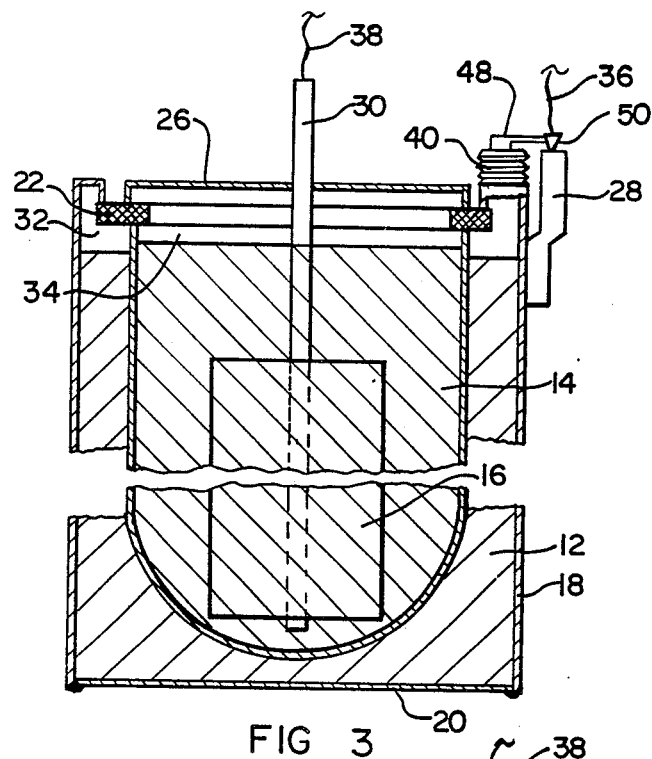
FIG. 3 shows a view similar to FIG. 1 of another cell according to the invention.

Turning now to FIG. 3, the same reference numerals are used as in FIG. 1 unless otherwise specified, and the anode is once again between the tube 24 and casing 18, with the cathode inside the tube 24. In this case, the bellows 40 carries an insulating limb 48, at whose tip is a contact 50 connected to the lead 36, the post 28 being connected to the side of the casing 18 and engaging the contact 50.

Upon full charging being exceeded expansion of the bellows 40 breaks the engagement between the post 28 and contact 50 (and hence the lead 36), thus breaking the external charging circuit of the cell. The cell is thus isolated from the charging potential and further overcharging is prevented. When the charging potential is subsequently removed, the cell can be brought into a charging mode by connecting the contact 50 and lead 36 to the post 28, eg by physically compressing the bellows 40. Discharge can then take place, with the bellows 40 contracting and maintaining said engagement until the cell 10 is again overcharged.

Figure 4:
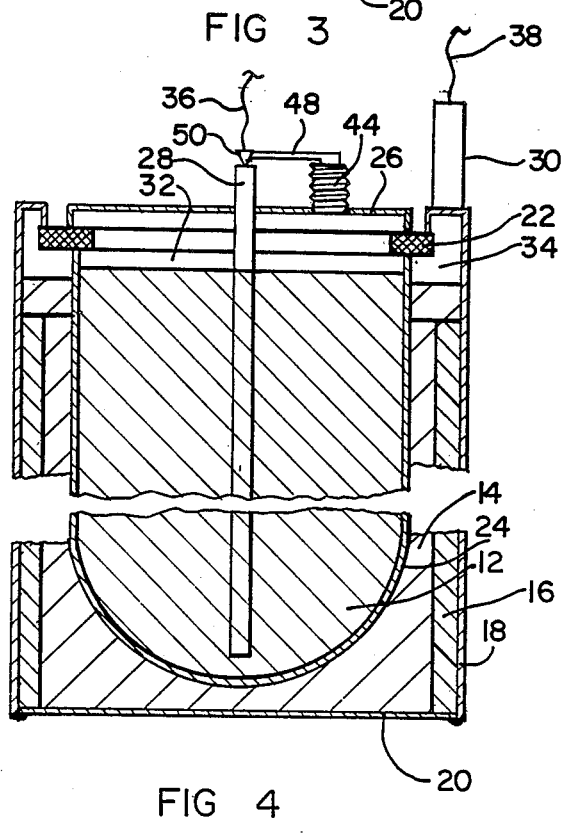
FIG. 4 shows a view similar to FIG. 1 of another cell according to the invention.

Turning to FIG. 4, the arrangement is similar to FIGS. 2 and 3 and again unless otherwise specified, the same reference numerals refer to the same parts as in FIGS. 2 and 3. In this case the anode 12 is inside the tube 24, as with FIG. 2, and the cathode 16 is between the tube 24 and casing 18, in contact with the casing; and the bellows arrangement is similar to that of FIG. 3. Operation is substantially similar to that of the cell of FIG. 3, with the bellows being shown at 44, and the limb 48 and contact 50 acting between the post 28 and lead 36, when the cell is overcharged.

In the drawings, an arrangement has been shown which prevents overcharging. However, it will be appreciated that the invention can in a fashion similar to FIGS. 3 and 4 prevent overdischarging, if desired. Thus, to prevent both overcharging and overdischarging the cell of FIG. 1 can be provided also with an arrangement similar to the bellows 44, limb 48 and contact 50 of FIG. 4, acting between the post 30 and lead 38 of FIG. 1, as shown in broken lines in FIG. 1. Overdischarge in this case leads to an increase in the volume of the cathode 16 and a rise in the level of electrolyte 14, expanding the bellows to break the engagement between the lead 38 and post 30. This breaks the external circuit and prevents further overdischarging. Upon subsequent charging the bellows can be physically depressed or contracted to connect lead 38 with post 30, and this charging will relieve pressure in the bellows to allow this contact to be maintained until the cell is again overdischarged.

Likewise, the cell of FIG. 2 can be provided with an arrangement for its post 30 and lead 38, similar to the arrangement of the bellows 40, limb 48 and contact 50 of FIG. 3. Operation is substantially the same as FIG. 1, in the event of overdischarge.

Usually, it is contemplated that it will be desired to prevent overcharging by means of the invention, or possibly both overcharging and overdischarging. If however it is desired to prevent only overdischarging, the arrangement of FIGS. 3 and 4 can be used, with regard to the bellows 40, 44 and limb 48 and engagement 50, but with an outside cathode (see FIG. 4) employed in FIG. 3, and an inside cathode (see FIG. 3) employed in FIG. 4.

The invention thus provides a simple and reliable means for preventing overdischarging and, potentially, overcharging, and accordingly provides means for combatting damage caused by such overcharging or overdischarging.

If desired, to prevent high instantaneous currents and spark pitting, the contact 42 (FIG. 1) or 46 (FIG. 2) can be provided with a suitable current limiting device such as a resistor (not shown).

Naturally, if the space above the anode material or liquid electrolyte is, instead of containing a gas under a pressure above atmospheric, evacuated, the bellows can be expanded in the fashion described above by liquid anode material or liquid electrolyte itself, without departing from the invention.

We claim:

1. A rechargeable electrochemical power storage cell which comprises an anode compartment containing active anode material which is liquid at the operating temperature of the cell;

a cathode compartment containing an electrolyte which is liquid at the operating temperature of the cell and an active cathode material; and a separator which separates said compartments from each other and through which separator active anode material passes from the anode compartment to the cathode compartment during discharging of the cell, to enter the cathode compartment in ionic form, and through which separator the active anode material passes from the cathode compartment to the anode compartment during charging of the cell, at least one of said compartments being selected and being provided with switch means, the switch means being operative in response to an excursion, past a threshold value, of pressure in the sealed compartment arising from movement of active anode material through the separator during operation of the cell while it is connected to an external circuit, thereby to prevent further operation of the cell while said pressure remains past said threshold value.

2. A cell as claimed in claim 1, in which the switch means is operative in response to an increase, past said threshold value, of pressure in the sealed compartment, to prevent further operation of the cell while said pressure exceeds the threshold value.

3. A cell as claimed in claim 1, in which each of said cell compartments is sealed and is provided with said switch means.

4. A cell as claimed in claim 1, in which each switch means is arranged to prevent further operation of the cell by breaking the external circuit of the cell.

5. A cell as claimed in claim 1, in which the anode compartment is sealed and is provided with said switch means, the switch means being arranged to prevent further operation of the cell in response to an increase, past said threshold value, of pressure in the anode compartment, by short-circuiting the cell while leaving the external circuit intact.

6. A cell as claimed in claim 1, in which each switch means is automatically reversible, after operation thereof in response to a pressure excursion past the threshold valve, in response to a retreat of the pressure past the threshold value in the opposite direction to the excusion, to permit further operation of the cell via the external circuit.

7. A cell as claimed in claim 1, in which each sealed compartment having said switch means has a wall at least part of which is resiliently deformable in response to pressure changes in said compartment, said wall being provided with an electrical contact which forms part of the switch means and which is movable in response to pressure changes in said compartment to operate the switch means.

8. A cell as claimed in claim 7, in which part of the wall of the compartment is resiliently deformable and is provided by a resilient bellows which is provided with said contact.

9. A cell as claimed in claim 1, in which the active anode material is sodium and the separator is a solid electrolyte which is a conductor of sodium ions.

10. A cell as claimed in claim 9, in which the cathode is in the form of an electrolyte-permeable electronically conductive porous matrix which is impregnated with the liquid electrolyte, the liquid electrolyte being a sodium aluminium halide.

* * * * *